United States Patent [19]

Oikawa et al.

[11] Patent Number: 5,165,910
[45] Date of Patent: Nov. 24, 1992

[54] METHOD FOR PREPARING STABILIZED AQUEOUS CHLORINE DIOXIDE SOLUTION

[75] Inventors: Kikuo Oikawa, Niigata; Yasushi Hayashi, Nara, both of Japan

[73] Assignee: Sekisui Kaseihin Kogyo Kabushiki Kaisha, Nara, Japan

[21] Appl. No.: 600,292

[22] Filed: Oct. 19, 1990

Related U.S. Application Data

[63] Continuation of Ser. No. 367,298, Jun. 16, 1989, abandoned.

[30] Foreign Application Priority Data

Jun. 17, 1988 [JP] Japan .................................. 63-150540

[51] Int. Cl.$^5$ .............................................. C01B 117/02
[52] U.S. Cl. .................................................... 423/477
[58] Field of Search ......................................... 423/477

[56] References Cited

U.S. PATENT DOCUMENTS 3,271,242  9/1966  McNicholas et al. ................. 424/65
4,234,446  11/1980  Ramras ............................... 423/477

FOREIGN PATENT DOCUMENTS 959238  12/1974  Canada ................................ 423/477

OTHER PUBLICATIONS

Chemical Abstracts 82:142249e.
Chemical Abstracts 90:154270h.

Primary Examiner—John Niebling
Assistant Examiner—Brian M. Bolam
Attorney, Agent, or Firm—Nikaido, Marmelstein, Murray & Oram

[57] ABSTRACT

A compact manufacturing method of an aqueous stabilized chlorine dioxide comprising adding to an aqueous 0.1-5% alkali metal chloride solution an aqueous alkali metal hypochlorite solution at 5-40 ppm, while before and after the addition of the hypochlorite solution an organic acid such as citric acid or an inorganic acid such as hydrochloric acid is used to adjust pH to 7-9 or 2-5.6, respectively, which is useful as disinfectant or deodorant.

4 Claims, No Drawings

METHOD FOR PREPARING STABILIZED AQUEOUS CHLORINE DIOXIDE SOLUTION

This application is a continuation of application Ser. No. 367,298 filed Jun. 16, 1989, now abandoned.

BACKGROUND OF THE INVENTION

1. Field of the Invention

The invention relates to a manufacturing method of an aqueous stabilized chlorine dioxide solution which is effective when used as a germicide, disinfectant or deodorant.

2. Description of the Prior Art

It is known that chlorine dioxide ($ClO_2$) has an intensive oxidizing capability concerning functions of sterilizing, deodorizing, bleaching and the like. However, chlorine dioxide has such disadvantages that since it is originally a gas, it is hard to be stored while chlorine dioxide requires a gas generator in use.

As a typical gas generator, the apparatus is known which generates chlorine dioxide as a gas by utilizing the following reaction.

In the apparatus, sodium chlorite and sodium hypochlorite as starting materials are used in equivalent amounts on the basis of the above reaction, i.e., in a molar ratio of about 2:1.

However, absorbing the chlorine dioxide gas from such a gas generator in water does not provide an aqueous stabilized chlorine dioxide solution, since chlorine dioxide absorbed is easily dissociated in a short time.

In recent years, such a method has been realized as shown in U.S. Pat. No. 3,271,242 that generated chlorine dioxide is to be absorbed in an aqueous alkali solution (e.g., sodium percarbonate solution) to thereby be stabilized. Such an aqueous solution is generally called "a stabilized chlorine dioxide" and is commercially available.

However, the method essentially comprises a gas generating step and a gas absorbing step as aforementioned and therefore causes complexity. Further, the concentration of chlorine dioxide in the solution can not easily be controlled through the gas absorbing step. Furthermore, according to the experiments by the inventors of the present invention, the aqueous solution prepared by the method is insufficient in stability and some amount of chlorite ions dissociated from chlorine dioxide are frequently found therein.

Under the circumstances, the inventors have conducted various studies and have found the fact that an aqueous stabilized chlorine dioxide solution with excellent stability on chlorine dioxide can be obtained by an one-step method, i.e., by subjecting a small amount of an alkali metal hypochlorite to react with a specific excessive amount of an alkali metal chlorite in an aqueous medium having a specific pH.

SUMMARY OF THE INVENTION

According to the present invention, it provides a manufacturing method of an aqueous stabilized chlorine dioxide solution which comprises, (a) adding to an aqueous 0.1–5% alkali metal chlorite solution an aqueous alkali metal hypochlorite solution at 5–40 ppm (calculated as hypochlorous acid) and then adding to the resulting solution an organic or inorganic acid at an amount sufficient to adjust pH to 7–9 or 2–5.6, or (b) adding previously to the aqueous 0.1–5% alkali metal chlorite solution the organic or inorganic acid at an amount sufficient to adjust pH of a final solution to 7–9 or 2–5.6 and adding to the resulting solution the aqueous alkali metal hypochlorite solution at 5–40 ppm.

DETAILED DESCRIPTION OF THE PREFERRED EMBODIMENT

The alkali metal chlorite to be used in the present invention may be sodium chlorite ($NaClO_2$) and potassium chlorite ($KClO_2$), the former being preferable. The alkali metal chlorite is in the form of aqueous solution at 0.1–5% (1,000–50,000 ppm) or preferably at 2–4%. To such aqueous alkali metal chlorite solution having the abovesaid concentration is added 5–40 ppm (calculated as hypochlorous acid HClO) of an alkali metal hypochlorite such as sodium hypochlorite or potassium hypochlorite.

The additional amount of alkali metal hypochlorite constitutes one of the novel features of the present invention. A typical conventional methods of generating chlorine dioxide required an alkali metal hypochlorite at ½ mol with respect to chlorite according to the following formula.

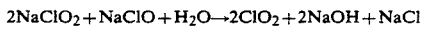

By contrast, the inventors have observed that the method of the present invention requires that only a quite small amount of the alkali metal hypochlorite with respect to chlorite is sufficient to provide an aqueous stabilized chlorine dioxide solution suitable for use in the aimed sterilization, deodorization and the like.

Also, in the method of the present invention, there is carried out an addition of the organic or inorganic acid whose amount is sufficient to adjust pH of a final solution to be 7–9 or 2–5.6. The above-mentioned addition may be performed after or prior to the step when a predetermined amount of an aqueous alkali metal hypochlorous acid solution is added to an aqueous alkali metal chlorous acid solution.

The organic acid may be acetic acid or an organic hydroxy carboxylic acid. Further, the organic hydroxy carboxylic acid may be citric acid, lactic acid or malic acid. Among the organic acids, citric acid is preferable for use. The organic hydroxy carboxylic acid is considered, other than having an adjustment function of pH in aqueous solution, to be in an intimate relation to generation of chlorine dioxide in the method of the present invention. The amount of the organic acid used varies with the specific concentration of the aqueous alkali metal chlorous acid solution, the additional amount of the aqueous alkali metal hypochlorite solution, and a desirable pH, but may be about 50–5 ppm.

The inorganic acid may be hydrochloric acid, sulfuric acid or phosphoric acid. Among them, use of hydrochloric acid is preferable. The inorganic acid is used as being in the form of a diluted aqueous solution at an amount sufficient for adjusting pH to a desired value.

When adjusting pH to be 7–9, it is preferable to use the organic hydroxy carboxylic acid, while when using the inorganic acid or acetic acid it is preferable to adjust pH to be 2–5.6.

It was confirmed by the inventors that in an aqueous solution obtained by the process there is a stable presence of chlorine dioxide as will be shown in the practical embodiments described later. And, the amounts of the chlorine dioxide present are at specific values effectively usable for deodorant, disinfectant and the like. To be noted is that in use for germicide, the solution when added with the organic hydroxy carboxylic acid can have an increased effective amount of chlorine dioxide.

On the other hand, the inventors have designed a polarographic diaphragm type measuring device provided with three electrodes using gold for working electrode, platinum for counter electrode, and silver/silver chloride for reference electrode, which permits a quantitative analysis of chlorine dioxide in aqueous solution with high accuracy. Thus, the adjustment or the control of $ClO_2$ concentration in the solution obtained by the claimed method may preferably be effected with the measuring device.

EXAMPLES 1–3

Sodium chlorite ($NaClO_2$) (commercially available 87% product) was prepared as an aqueous solution of concentration almost at 20000 ppm.

Added thereto is sodium hypochlorite (NaClO) so as to provide specific concentrations 5, 10 and 20 ppm (converted by chlorous acid). Further, citric acid is added to the aqueous solution to make arrangement for various pH, thereby providing specific preparations. Specific concentrations of the materials, and pH and components of the preparations are as shown in Table I.

Measuring of concentrations was made in the following manner.

(i) Iodine titration was applied to $NaClO_2$, NaClO, $ClO_2$.

(ii) Ion chromatography through IC100 apparatus made by Yokogawa Electric Ltd. (JAPAN) was applied to $ClO_2^-$, $ClO_2^{31}$, $Cl^-$.

In detail,
Column PAX-1, SAX-1
Column temperature: 40° C.
Eluate: 1 mM $Na_2CO_3$/2mM $NaHCO_3$
Flow amount: 2 ml/min
Remover system: Ion exchange membrane
Flow amount: 2 ml/min
Remover liquid: 0.05 M Sodium dodecylbenzensulfonate
Flow amount: 2 ml/min
Injection Amount: 100 μl (iii) $ClO_2$ was subjected to measurement by three electrodes polarographic diaphragm type electrodes apparatus. In detail,
Working electrode: Gold
Counter electrode: Platinum
Reference electrode: Silver/Silver chloride
Diaphragm: Porous polypropylene (specific hole diameter 25 μm)
Buffer: Sodium acetate buffer pH 4.0
Set electrode: +0.55 V
Detector: DIONEX Inc. ECD detector
Recorder: YOKOGAWA ELECTRIC Ltd 3066 type

TABLE I

| | Materials | | | | Preparations | | | | |
| --- | --- | --- | --- | --- | --- | --- | --- | --- | --- |
| | | | | | $ClO_2$ | | $ClO_2^-$ | $ClO_3^-$ | $Cl^-$ |
| | | | | | Three electrodes method | Iodine titration | Ion-chromatographic method | | |
| | $NaClO_2$ | NaClO | Citric acid | pH | | | | | |
| Example | | | | | | | | | |
| 1 | 19700 | 20 | 36 | 8.5 | 30 (19.5) | 13,000 | 15,400 (10,000) | 28 (18.2) | 1560 (1012) |
| 2 | 19700 | 10 | 27.5 | 8.4 | 33 (22.4) | 12,850 | 15,300 (10,000) | 26 (16.9) | 1730 (1123) |
| 3 | 19700 | 5 | 12.5 | 8.7 | 14 (9.1) | 12,800 | 15,700 (10,000) | 24 (15.6) | 1750 (1136) |
| Commercially available products | | | | | | | | | |
| A | — | — | — | 9.1 | 13.43 (2.34) | 52,200 | 57,500 (10,000) | 730 (130) | 1400 (240) |
| B | — | — | — | 9.1 | 1.31 (0.42) | 22,700 | 29,800 (10,000) | 400 (130) | 3700 (1240) |
| C | — | — | — | 9.8 | 24.25 (3.19) | 56,200 | 76,100 (10,000) | 4370 (570) | 6800 (890) |

Note 1:
1. Unit for the above values is ppm.
2. Those in the parenthesis are converted values when $ClO_2$ is fixed to be 10,000.

An amount of content of $ClO_2$ after one month storage of the abovesaid preparations of the present invention at room temperature was measured by the three electrodes method and observed that there is no substantial lowering of the content of $ClO_2$. Also, bacteriocidal effects on general bacteria and E.coli of the preparations of the present invention were tested and revealed to be 99.99% of sterilization efficiency for all the preparations.

EXAMPLES 4–7

Sodium chlorite ($NaClO_2$) (commercially available 87% product) was prepared as an aqueous solution with 1000 ppm concentration.

Added thereto was sodium hypochlorite aqueous solution for providing specific solution with 10 ppm and 30 ppm as converted by hypochlorous acid.

Next, citric acid or a diluted hydrochloric acid was added to adjust pH, and $ClO_2$ content in the obtained solution was measured by the three electrode polarographic diaphragm type electrodes apparatus disclosed in the above Examples 1–3. Changes of $ClO_2$ content and pH in the sequential days are as shown in the following tables.

|  | Days | | | | | | |
|---|---|---|---|---|---|---|---|
| Example | 0 | 7 | 14 | 21 | 28 | 35 | 108 |
| pH being adjusted by use of citric acid | | | | | | | |
| 4 (Hypochlous acid, 10 ppm) | 42.8* (4.8)** | 43.0 (4.8) | 45.3 (4.7) | 45.9 (4.9) | 41.0 (4.8) | 41.0 (4.7) | 35.2 (4.8) |
| 5 (Hypochlous acid, 30 ppm) | 119.6 (4.6) | 112.9 (4.6) | 117.6 (4.5) | 114.1 (4.6) | 101.3 (4.5) | 106.6 (4.9) | 80.9 (5.0) |
| pH being adjusted by use of HCl | | | | | | | |
| 6 (Hypochlous acid, 10 ppm) | 43.2* (4.2)** | 45.2 (4.7) | 49.2 (5.0) | 45.5 (5.3) | 44.5 (5.3) | 44.7 (5.7) | 29.9 (5.6) |
| 7 (Hypochlous acid, 30 ppm) | 112.9 (4.8) | 103.6 (4.5) | 106.3 (4.4) | 100.2 (4.4) | 93.2 (4.4) | 94.5 (4.4) | 60.1 (4.6) |

*concentration of $ClO_2$
**pH

As seen from the above tables, the obtained aqueous stabilized chlorine dioxide solution can have stability also at the acidic side for at least one month while conventionally considered as being stable only at an alkaline side. It was also confirmed that during the three months storage, there appears a lowering of $ClO_2$ content but the solution still contains an effective amount of $ClO_2$.

In the meantime, an aqueous stabilized dioxide solution obtained by a similar test with citric acid being used to adjust pH to be in a range of 6-7 showed a notable lowering of $ClO_2$ content after three months.

The method according to the present invention can quite easily manufacture an aqueous solution containing a stabilized chlorine dioxide at any desired concentration with a simple method without generating chlorine dioxide gas, so that the invention is quite highly valuable for industrial use and also has such advantages that:

i) Chemical composition of $ClO_2$, $ClO_2^-$, $ClO_3^-$ and the like in the products are quite stable (being constant).

ii) Products at any desired concentration and with high quality (having a predetermined concentration of $ClO_2$) can be provided.

In use, the products prepared by 0.1%$NaClO_2$ can be usable directly by the primary liquid itself without necessity of two-liquid provision, i.e., addition of acids such as citric acid, phosphoric acid, and the like as activator.

iii) Free $Cl^{31}$ is at 1560-1750 ppm smaller in amount than the conventional products and constant at the concentration (when $Cl^-$ is greater, it may generate trihalomethane harmful to the sterilization process of drinking water, foods, and the like).

iv) Content of $ClO_3^-$ is 24-28 ppm smaller at 1-2 figures than the conventional products, and is stable at the concentration. (It is preferable that $ClO_3^-$ is less in value in view of toxicity.)

What we claimed is:

1. A one-step method for preparing a stabilized chlorine dioxide solution consisting essentially of adding to an aqueous solution containing 0.1-5% by weight of an alkali metal chlorite a) an alkali metal hypochlorite to a concentration of 5-40 ppm in the aqueous solution and b) an organic acid in an amount sufficient to adjust the pH of the aqueous solution to 7-9, whereby the alkali metal hypochlorite reacts with the alkali metal chlorite to form chlorine dioxide in the aqueous solution.

2. A method according to claim 1, wherein the organic acid is acetic acid or citric acid.

3. A one-step method for preparing a stabilized chlorine dioxide solution consisting essentially of adding to an aqueous solution containing 0.1-5% by weight of an alkali metal chlorite a) an alkali metal hypochlorite to a concentration of 5-40 ppm in the aqueous solution and b) an inorganic acid in an amount sufficient to adjust the pH of the aqueous solution to 2-5.6, whereby the alkali metal hypochlorite reacts with the alkali metal chlorite to form chlorine dioxide in the aqueous solution.

4. A method according to claim 3, wherein the inorganic acid is hydrochloric acid.

* * * * *